(12) United States Patent
Jones

(10) Patent No.: US 7,231,030 B2
(45) Date of Patent: *Jun. 12, 2007

(54) PASSIVE CALL BLOCKING METHOD AND APPARATUS

(75) Inventor: Clifton T. Jones, Garner, NC (US)

(73) Assignee: LongBoard, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/864,212

(22) Filed: Jun. 8, 2004

(65) Prior Publication Data

US 2004/0234062 A1 Nov. 25, 2004

Related U.S. Application Data

(63) Continuation of application No. 09/919,435, filed on Jul. 30, 2001.

(51) Int. Cl.
*H04M 1/57* (2006.01)
*H04M 3/436* (2006.01)

(52) U.S. Cl. .................... 379/210.02; 379/142.06; 379/196; 379/207.15; 379/210.03

(58) Field of Classification Search ............ 379/142.01, 379/142.04, 142.06, 188, 196, 197, 198, 379/199, 201.11, 207.13, 207.15, 210.02, 379/210.03
See application file for complete search history.

(56) References Cited

U.S. PATENT DOCUMENTS

| 5,003,595 A | * | 3/1991 | Collins et al. ................. 707/9 |
| 6,496,569 B2 | * | 12/2002 | Pelletier et al. .......... 379/88.21 |
| 6,625,270 B1 | * | 9/2003 | Banwell et al. ............. 379/196 |
| 7,042,997 B2 | * | 5/2006 | Jones .................... 379/210.02 |

* cited by examiner

*Primary Examiner*—Harry S. Hong
(74) *Attorney, Agent, or Firm*—Duane Morris LLP

(57) ABSTRACT

A process and apparatus to support passive call blocking, a call block that is performed in a manner that the caller does not recognize as a call block. When passive call blocking is utilized, blocked callers receive a passive response, such as a continuous telephone ring, instead of an error message or rejection notification. The caller is thus unaware or uncertain that they have been blocked. Blocked calls are determined by comparing caller identification information with a caller database.

54 Claims, 9 Drawing Sheets

PASSIVE CALL BLOCKING METHOD AND APPARATUS

This is a Continuation of National application Ser. No. 09/919,435 filed Jul. 30, 2001.

BACKGROUND

1. Field of the Invention

Aspects of the present invention relate in general to telephony, and an apparatus and method to reject a call in a manner that the caller does not recognize as a block.

2. Description of the Related Art

In a conventional telephone network, users are able to subscribe to a Class 5 Call Blocking feature that allows them to maintain a list of callers that are unable to place a call through to the subscriber. Upon attempting to call the subscriber, a blocked caller is notified by a recording that their call has been rejected. The subscriber's telephone does not ring. The caller is thus aware that the subscriber is blocking them.

Similarly, in a mode of Internet telephony implementing the Session Initiation Protocol (SIP), users are able to subscribe to a comparable call blocking feature. In this case, call attempts made by blocked callers are met with a SIP 603 Decline response, which ends the call session. As with the Class 5 Call Blocking feature, blocked callers are thus aware that the subscriber is blocking them.

Outgoing calls are also subject to being blocked. Subscribers may choose to control outgoing calls by blocking certain telephone numbers, sets of numbers, or all numbers. Callers that attempt to make outgoing blocked calls on the subscriber's telephone are generally met with a request for authorization to complete the call or an error message. Once again, these callers become aware that they are being blocked.

Also known in the art is a "do not disturb" feature for telephones. When active this feature generally diverts all incoming calls immediately to voicemail, a recording, or an error message. A caller subjected to this feature may still easily recognize that their call has been rejected.

DETAILED DESCRIPTION

Figure 1:
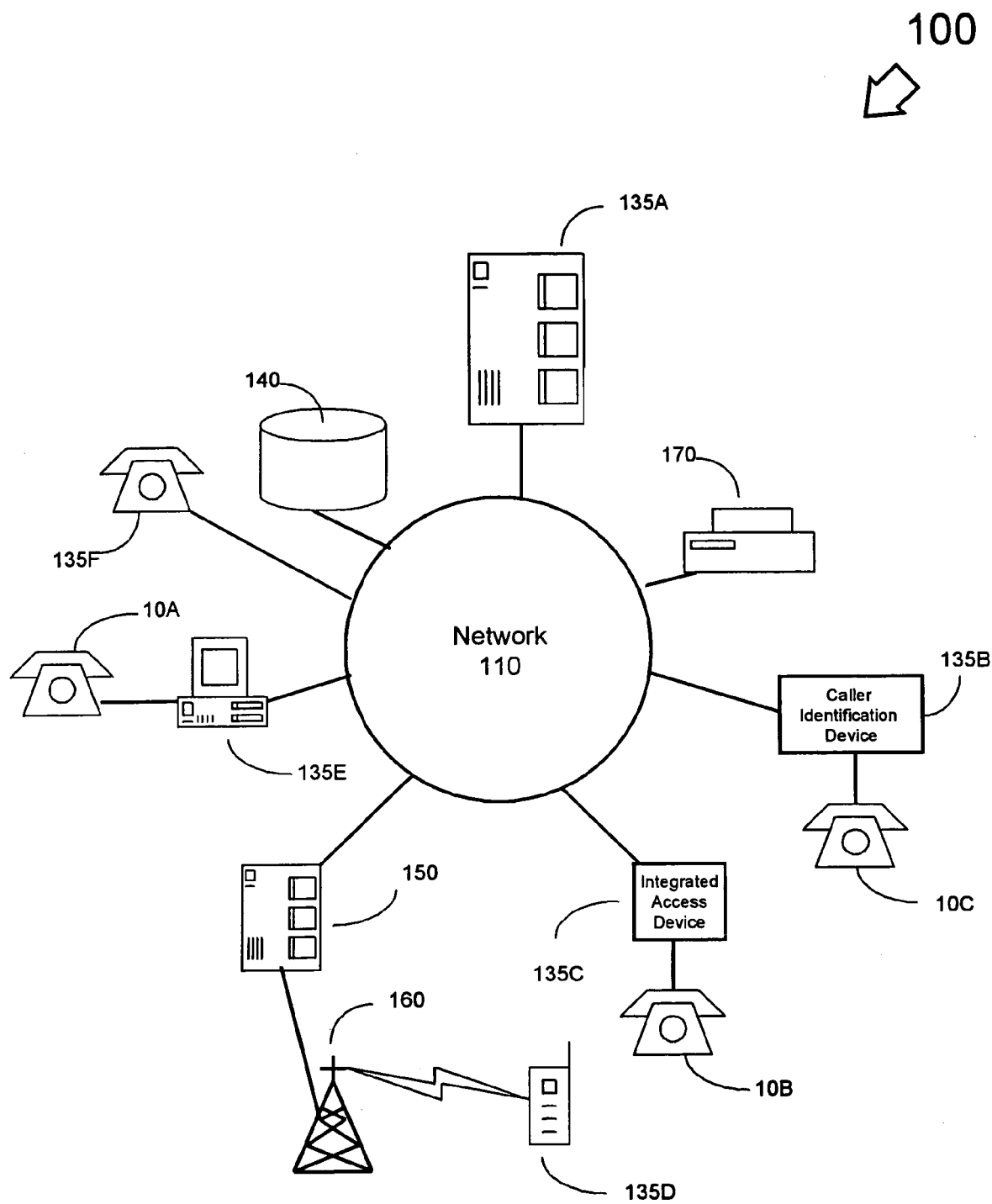
FIG. 1 is a diagram of a system embodiment that facilitates passive call blocking, a call block that is performed in a manner that the caller does not recognize as a call block.

What is needed is an apparatus and method capable of blocking calls in a passive manner that prevents the caller from recognizing a call block.

There are many circumstances when this type of known rejection is undesirable, i.e., when the subscriber does not want the caller to know that they are being blocked. A subscriber may be uncomfortable with a caller feeling rejected because they have been placed on a blocked caller list. A subscriber may also prefer to keep the fact that they are screening or monitoring calls private. Current features of telephony do not adequately address this problem.

Aspects of the present invention include a system, apparatus, user-interface, and methods for facilitating passive call blocking. As will be described below, passive call blocking may be performed over any communications network as is known in the art. In some embodiments, passive call blocking may be performed on a conventional telephone network, an integrated access device (IAD) in conjunction with an Intelligent Network (IN), or Next Generation Network (NGN).

The term "passive call blocking," as used herein, may refer to any attempt to block any form of communication conducted over any network, in a manner that prevents the initiator of the communication from recognizing the block. The term "call" refers to any attempt to communicate over a network, the term "caller" refers to the initiator of the call, and the term "callee" refers to the intended recipient of the call. In some embodiments, a call may be a telephone call, Internet telephony call, instant message or other peer-to-peer communication, wireless call, or page. Other means of making a call are well known to those of skill in the art.

The term "subscriber," as used herein, may refer to any user of passive call blocking or user of a device that facilitates passive call blocking. For example, a subscriber may be the callee of an incoming call. For outgoing calls, a subscriber may be a phone system administrator.

When passive call blocking is utilized, blocked callers receive a passive response, such as a continuous telephone ring, instead of an error message or rejection notification. The caller is thus unaware or uncertain that they have been blocked. Those of skill in the art will understand that the following embodiment methods, systems, and apparatus may be equally applied to analog, digital, audio, video, or multimedia communications, or any combination thereof.

Passive call blocking may be facilitated through a number of differing embodiments that associate caller identification information with a caller database. Examples of caller identification information include, but are not limited to, data such as caller ID information, telephone numbers, IP addresses, email addresses, user names, or any other form of caller or callee identifying information existing on a communications network. Caller identification information may also refer to information that is input by a caller when making a call. A caller database may be any database of caller identification information. Such a database may be a list of callers that a user desires to block. Hence, in one embodiment, caller identification information may be compared to a caller database of blocked callers in determining whether to passively block or alert the callee of the incoming call. In another embodiment, caller identification information may be compared to a caller database of acceptable callers in determining whether to passively block or accept an incoming call. In other embodiments, caller identification information may be compared to a caller database in passively blocking outgoing calls.

FIG. 1 is a simplified functional diagram depicting system 100, constructed and operative in accordance with an embodiment of the present invention. System 100 is configured to facilitate passive call blocking among various communication devices.

In system 100, passive call block devices 135 are connected via a communications network 110. A passive call block device 135 is any device that may facilitate passive call blocking, such as a telephone 135F or computer 135E.

Users may communicate to other users via integrated access devices 135C; computers 135E; telephones 135F; telephones 10A–C coupled to computers 135E, integrated access devices 135C, or caller identification devices 135B; or wireless phones 135D. It is known in the art that such devices may be coupled via a single or multiple number of networks 110.

In some embodiments, integrated access device 135C may be a personal computer, personal digital assistant (PDA), wireless phone, or other such network-computing device. Integrated access device 135C may be any apparatus known in the art that is able to communicate on the network 110.

Caller identification device 135B may be a caller ID box or other such data-collecting device. In addition to performing caller ID functions, caller identification device 135B may include features to perform passive call blocking. For example, caller identification device 135B may be a caller ID box that incorporates a modifiable caller database which is used in determining whether to block a call.

The network 110 may also include other networkable devices known in the art, such as other integrated access devices 135C, storage media 140, a call server 135A, telephone server 150 and wireless telephone base station 160. Call server 135A may be any server coupled to network 110 that is accessed in connection with any communication across the network 110. Call server 135A may perform passive call blocking as disclosed herein. For example, a call may be routed through a call server 135A that determines whether or not to block the call.

It is well understood in the art that any number or variety of networkable devices or components may be coupled to the network 110 without inventive faculty, such as printers 170. Examples of other devices include, but are not limited to, servers, computers, workstations, terminals, input devices, output devices, printers, plotters, routers, bridges, cameras, sensors, or any other such device known in the art.

Network 110 may be any communication network known in the art, including a conventional telephone network, the Internet, a local-area-network (LAN), a wide-area-network (WAN), or any system that links a call server 135A to a telephone 10. Further, network 110 may be configured in accordance with any topology known in the art, including star, ring, bus, or any combination thereof.

Passive call block device 135 is connected to a network 110 that supports the receipt and transmission of digital packets. Telephone network server 150 may be configured to allow different networks to communicate, as well as communicate with a public switched telephone network (PSTN), plain old telephone service (POTS), Integrated Services Digital Network (ISDN), or any other telephone network. In some system embodiments, a call server 135A may obviate the use of integrated access devices 135C by call participants.

Furthermore, as shown in FIG. 1, telephone network server 150 may be coupled to wireless base station 160, which allows communication to wireless phone 135D.

Figure 2:
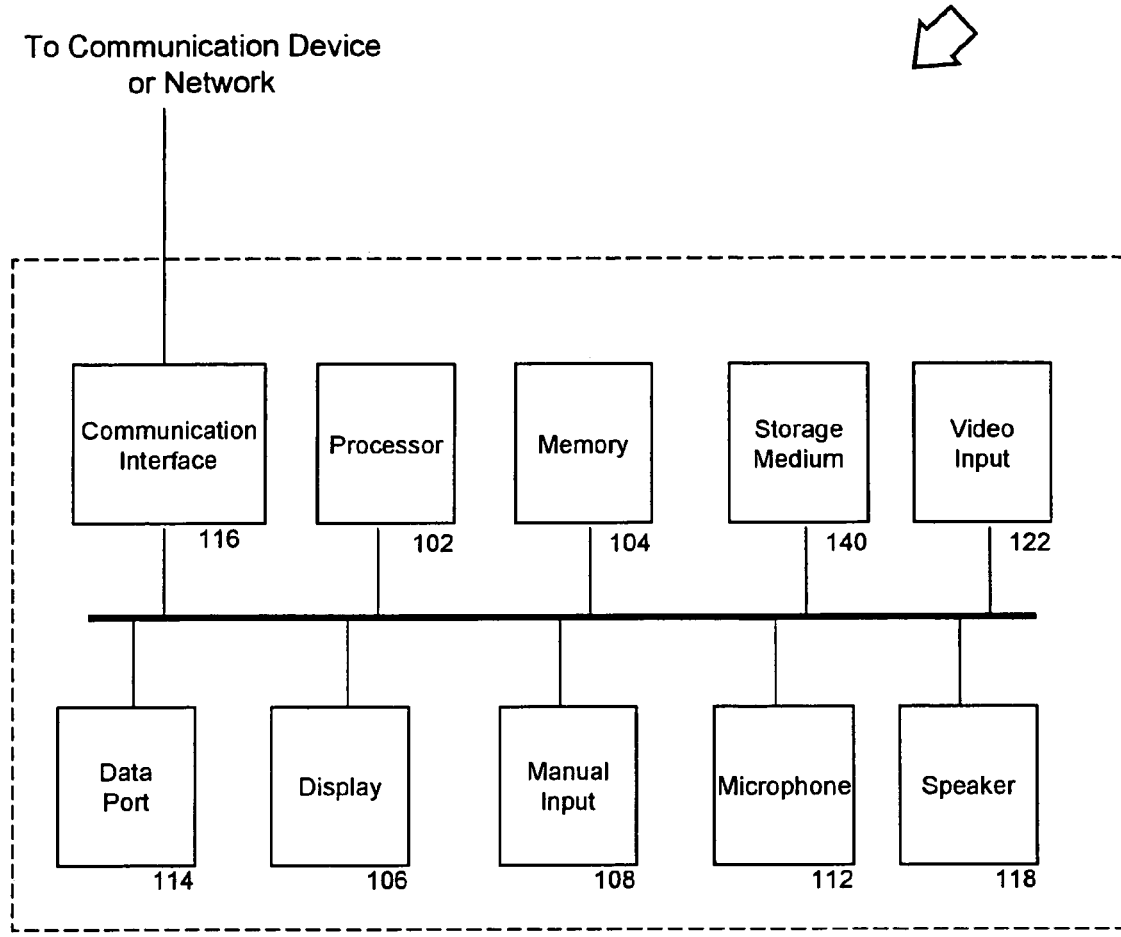
FIG. 2 depicts an apparatus embodiment that facilitates passive call blocking.

Embodiments will now be disclosed with reference to a functional block diagram of an exemplary passive call block device 135 of FIG. 2, constructed and operative in accordance with an embodiment of the present invention. Passive call block device 135 runs a multi-tasking operating system and includes at least one processor or central processing unit (CPU) 102. Processor 102 may be any microprocessor or micro-controller as is known in the art.

The software for programming the processor 102 may be found at a computer-readable storage medium 140 or, alternatively, from another location across network 110. Processor 102 is connected to computer memory 104. Passive call block device 135 may be controlled by an operating system (OS) that is executed within computer memory 104.

Processor 102 communicates with a plurality of peripheral equipment, including communication interface 116. Additional peripheral equipment may include a display 106, manual input device 108, storage medium 140, microphone 112, video input 122, and data port 114.

Display 106 may be a visual display such as a cathode ray tube (CRT) monitor, a liquid crystal display (LCD) screen, touch-sensitive screen, or other monitors as are known in the art for visually displaying images and text to a user.

Manual input device 108 may be a conventional keyboard, keypad, mouse, trackball, or other input device as is known in the art for the manual input of data.

Storage medium 140 may be a conventional read/write memory such as a magnetic disk drive, floppy disk drive, compact-disk read-only-memory (CD-ROM) drive, transistor-based memory or other computer-readable memory device as is known in the art for storing and retrieving data. Significantly, storage medium 140 may be remotely located from processor 102, and be connected to processor 102 via a network 110 such as a local area network (LAN), a wide area network (WAN), or the Internet.

Microphone 112 may be any suitable microphone as is known in the art for providing audio signals to processor 102. In addition, a speaker 118 may be attached for reproducing audio signals from processor 102. Video input 122 may be a digital or analog video camera device to record still or moving images. In some embodiments, video input 122 may be a scanner device. It is understood that microphone 112, speaker 118, and video input 122 may include appropriate digital-to-analog and analog-to-digital conversion circuitry as appropriate.

Data port 114 may be any data port as is known in the art for interfacing with an external accessory using a data protocol such as RS-232, Universal Serial Bus (USB), or Institute of Electrical and Electronics Engineers (IEEE) Standard No. 1394 ('Firewire'). In some embodiments, data port 114 may be any interface as known in the art for communicating or transferring files across a computer network, examples of such networks include Transmission Control Protocol/Internet Protocol (TCP/IP), Ethernet, Fiber Distributed Data Interface (FDDI), token bus, or token ring networks. In addition, on some systems, data port 114 may consist of a modem connected to communication interface 116. Similarly, communication interface 116 provides connectivity to passive call block device 135 to communicate with a telephone network server 150. Thus, the communication interface 116 allows the passive call block device 135 to communicate and process input and output from a telephone line.

Figure 3:
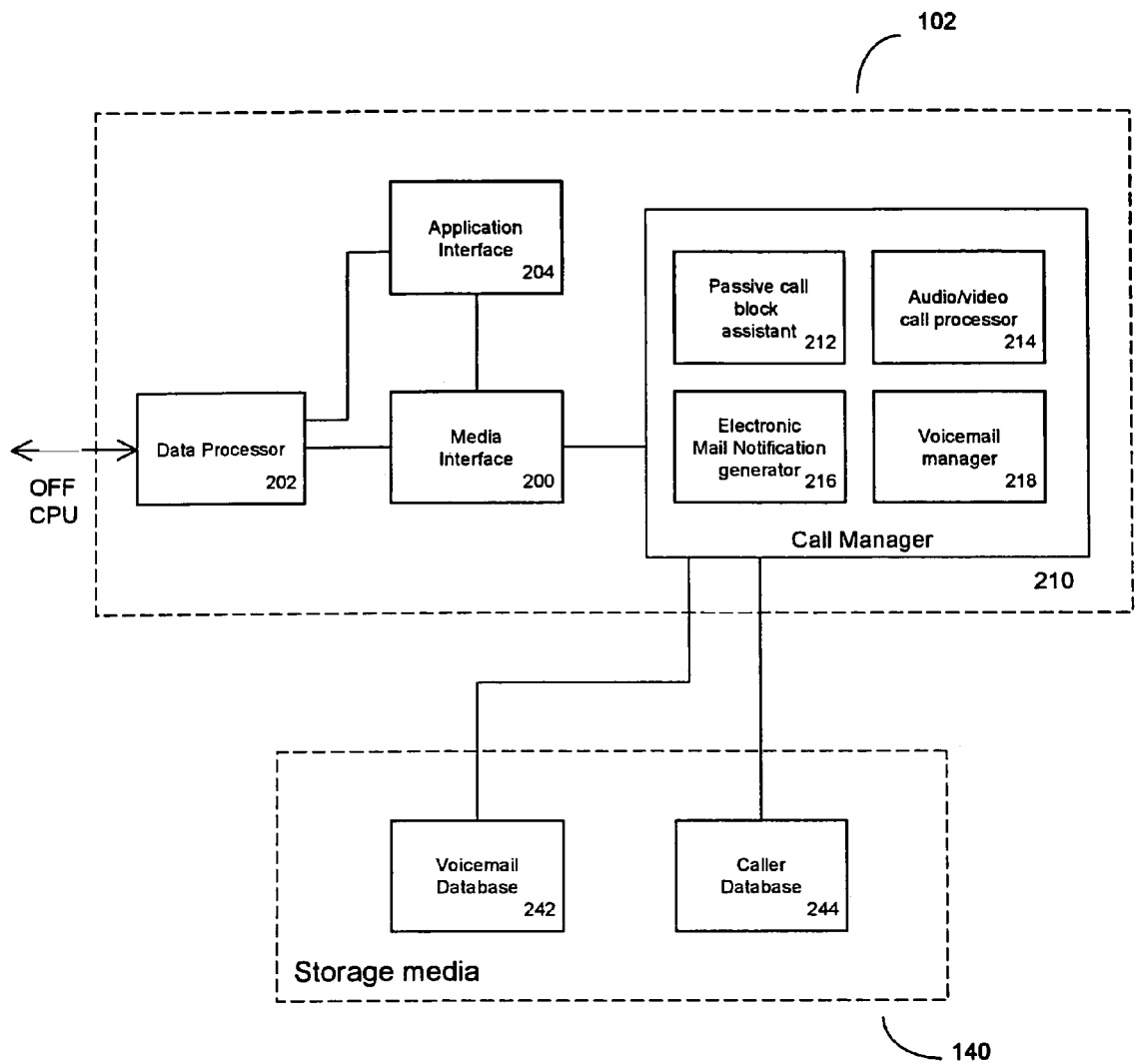
FIG. 3 is a block diagram of an apparatus embodiment that facilitates passive call blocking.

FIG. 3 is an expanded functional block diagram of CPU 102 and storage medium 140. It is well understood by those in the art that the functional elements of FIG. 3 may be implemented in hardware, firmware, or as software instructions and data encoded on a computer-readable storage medium 140. As shown in FIG. 3, central processing unit 102 comprises a data processor 202, an application interface 204, a media interface 200, and a call manager 210. These structures may be implemented as hardware, firmware, or software encoded on a computer readable medium, such as storage media 140. In addition, as shown in FIG. 3, storage media 140 may also contain a voice mail database 242 and a caller database 244.

Data processor 202 interfaces with display 106, manual input device 108, storage medium 140, microphone 112, data port 114, video input 122, and communication interface 116. The data processor 202 enables processor 102 to locate data on, read data from, and write data to, these components.

Application interface 204 enables processor 102 to take some action with respect to a separate software application or entity. For example, application interface 204 may take the form of a windowing user interface, as is commonly known in the art.

Figure 4:
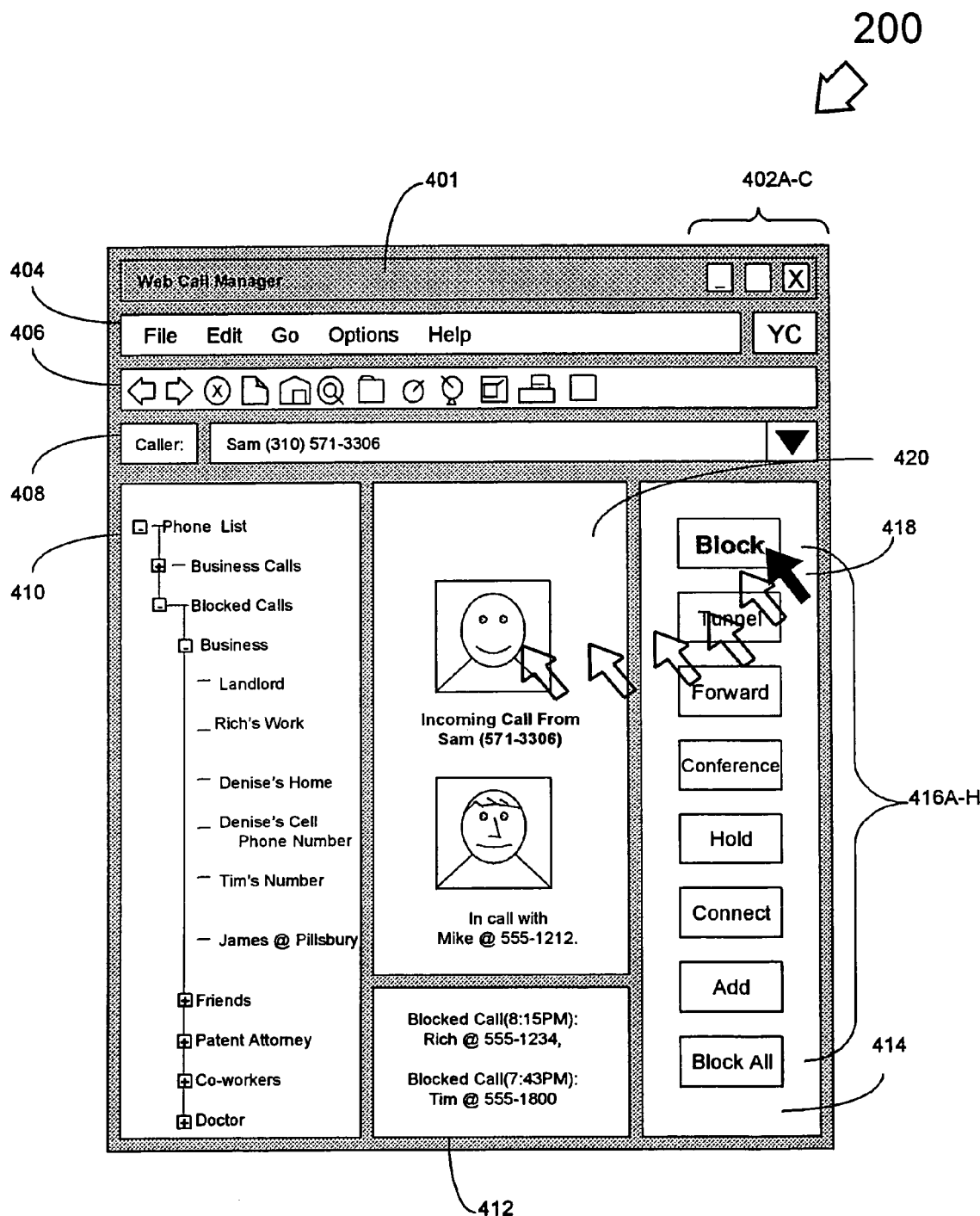
FIG. 4 is an illustration of a user interface embodiment that facilitates passive call blocking.

Media interface 200 may be a web-enabled call interface. In some embodiments, the media interface 200 may be a stand-alone program, or a web-browser window. An example of such a media interface window is shown in FIG. 4. Media interface window 200 comprises title bar 401, window control buttons 402A–C, menu bar 404, button bar 406, address bar 408, phone-list frame 410, main frame 420, status frame 412, and control frame 414.

In some embodiments, main frame 420 displays a picture of the current caller retrieved from a caller database 244. In such embodiments, using the mouse pointer 418, users may either click control buttons 416A–H, or "drag-and-drop" callers listed in the phone list frame 410, or pictures of the caller in the main frame 420 to control buttons 416A–H in the control frame 414. Media interface 200 then selects the appropriate structure to execute the functionality specified by the control button 416. In some embodiments, the phone list frame 410 may represent the caller database 244. As such, the caller database 244 may be easily manipulated through media interface 200. For example, caller identification. information may be added to or removed from a list of blocked calls in the phone list frame 410.

Returning to FIG. 3, call manager 210 may further comprise a passive call block assistant 212, an audio/video call processor 214, an electronic mail notification generator 216, and a voice mail manager 218.

Passive call block assistant 212 determines which callers are subject to passive call blocking. For example, suppose party A places a call to party B. The passive call block assistant 212 will compare the caller identification information provided by A to the caller database 244. If the caller database 244 indicates that the caller should be blocked, passive call block assistant 212 will cause a passive call block to be returned to party A. If the call is conducted over an ordinary telephone network 110, the passive call block response may be a continuous telephone ring.

Audio/video call processor 214 allows media interface 200 to utilize video input 122, microphone 112, speaker 118 and display 106 for audio or multimedia-video-based calls. Electronic mail notification generator 216 allows media interface 200 to communicate through text-based messaging systems, such as electronic mail or, in some embodiments, instant-messaging programs. Voice mail manager 218 communicates with media interface 200 and stores messages in a voice mail database 242. These components of the call manager 210 interact with a voice mail database 242 and a caller database 244, and may best be understood with respect to the flowcharts of FIGS. 5–8, as described below.

FIGS. 5–8 flowchart several processes that facilitate passive call blocking, constructed and operative in accordance with embodiments of the present invention. These processes are easily applied to telephone networks, Internet telephony, and other forms of communication over a network.

Figure 5:
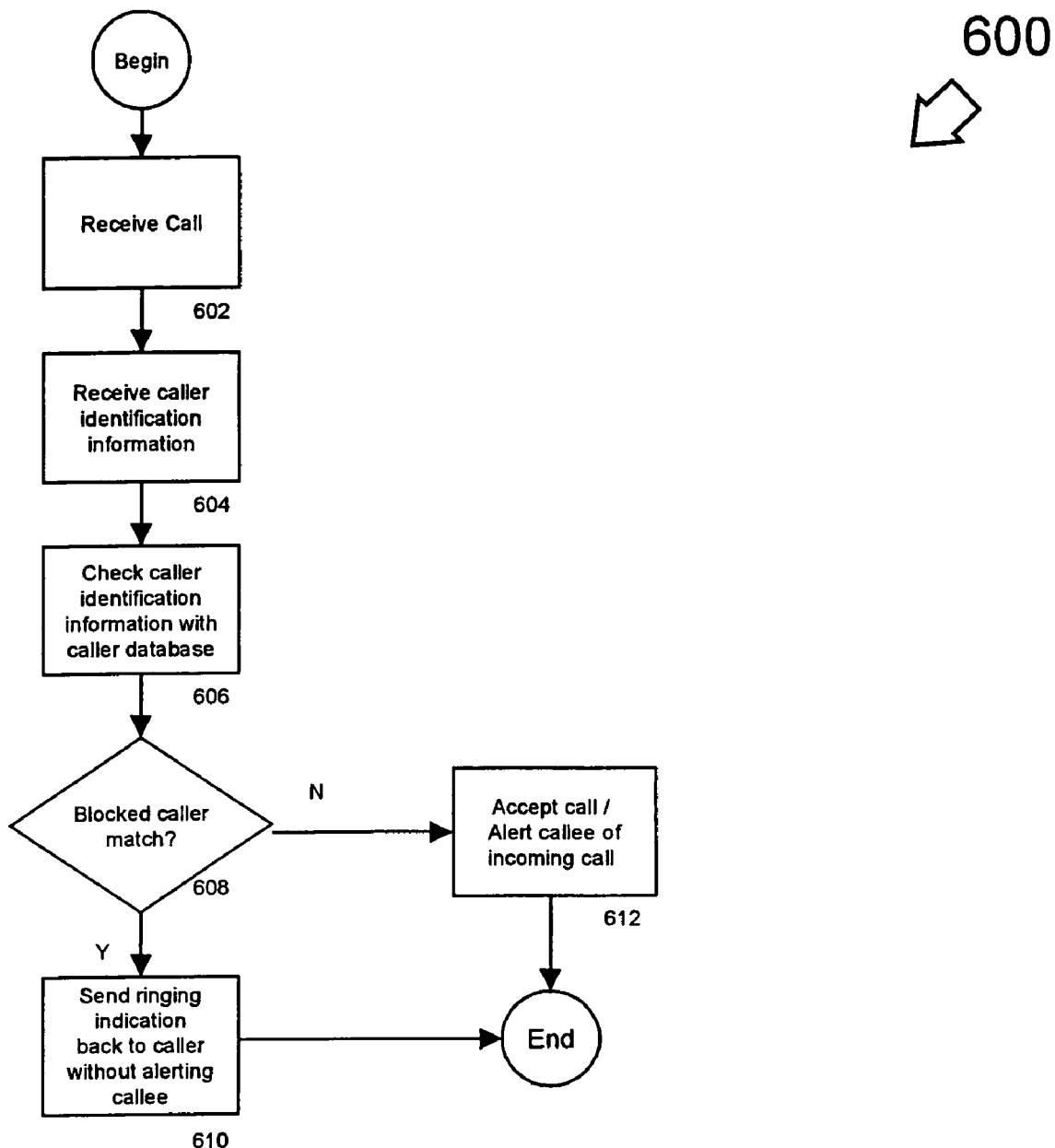
FIGS. 5–8 are flowcharts of various method embodiments that facilitate passive call blocking.

Following FIG. 5, in one embodiment, process 600, a passive call block device 135, such as a telephone or personal computer, receives a call, at block 602.

Typically, caller identification information is received shortly after the call, at block 604. In the PSTN environment, caller identification information is transmitted to the caller between the first and second ring signals. Hence, in one embodiment, a passive call block device 135 receiving a call via the PSTN environment will suppress the ringing signals until the caller identification information has been processed as disclosed herein. In alternate embodiments, caller identification information may be received simultaneously with or even preceding a call.

Upon receiving the caller identification information, the call manager 210 compares this information with the caller database, at block 606, to determine whether the caller should be passively blocked, at decision block 608. If the caller identification information does not match a blocked caller in the caller database 244, the call manager 210 will accept the call, at block 612. For incoming calls, the call may be accepted by alerting the callee of the call. For outgoing calls, the call may be accepted by transmitting the call to the intended callee. Other means of accepting calls are well known to those of skill in the art.

If the caller identification information matches information for a blocked caller in the caller database 244, the call manager 210 sends a ringing indication to the caller, at block 610, but the callee's telephone does not ring. Such a ringing indication is considered "false." After being subjected to a false ring without response, a caller will typically terminate the call. Hence, in this embodiment, calls that match a list of blocked callers are passively blocked. In alternate embodiments, the same result may be achieved regardless of when the ringing indication is sent to the caller upon receiving the call. For example, a ringing indication may be sent to a caller prior to checking the caller database. If the caller is subsequently determined to be an unblocked caller, the false ringing indication may be replaced with a "true" ring.

The ringing indication may take alternate forms. For example, in an Internet telephony system, the ringing indication may be a visual notification in the form of a text message displayed on a computer screen. In text- or video-based communications, the ringing indication may be replaced with a message such as "server busy," "unable to connect at this time," or "waiting for response."

Figure 6:
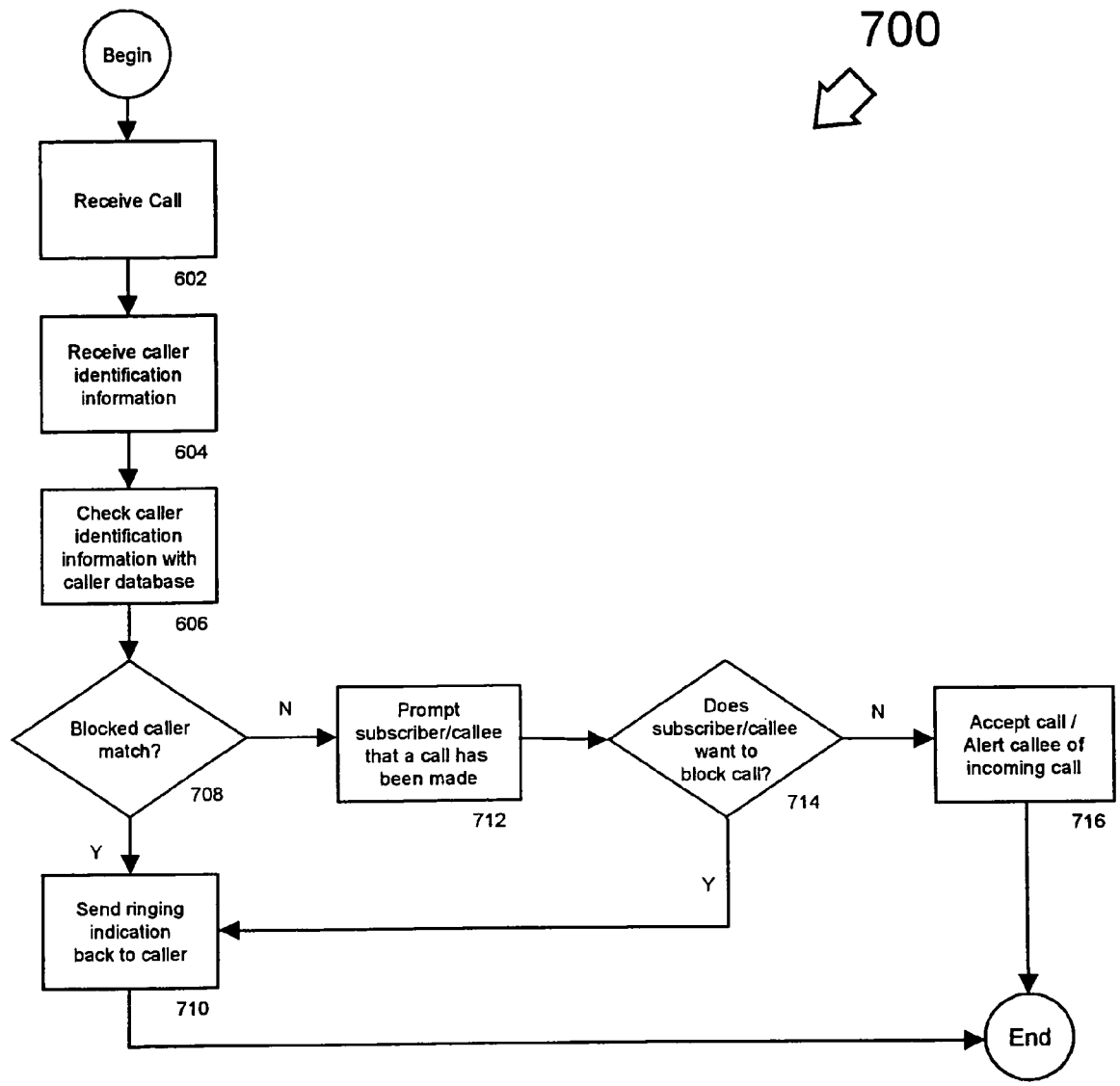

FIG. 6 illustrates process 700. This embodiment allows the call manager 210 to confirm that a caller should not be blocked. If the caller identification information does not match a blocked caller in the caller database 244, at decision block 708, the call manager 210 will prompt the callee that a call has been made, at block 712, and confirm whether the callee wishes to block the call, at decision block 714. If so, a false ringing indication is sent to the caller, at block 710. If not, the call manager 210 will accept the call, at block 716.

Figure 7:
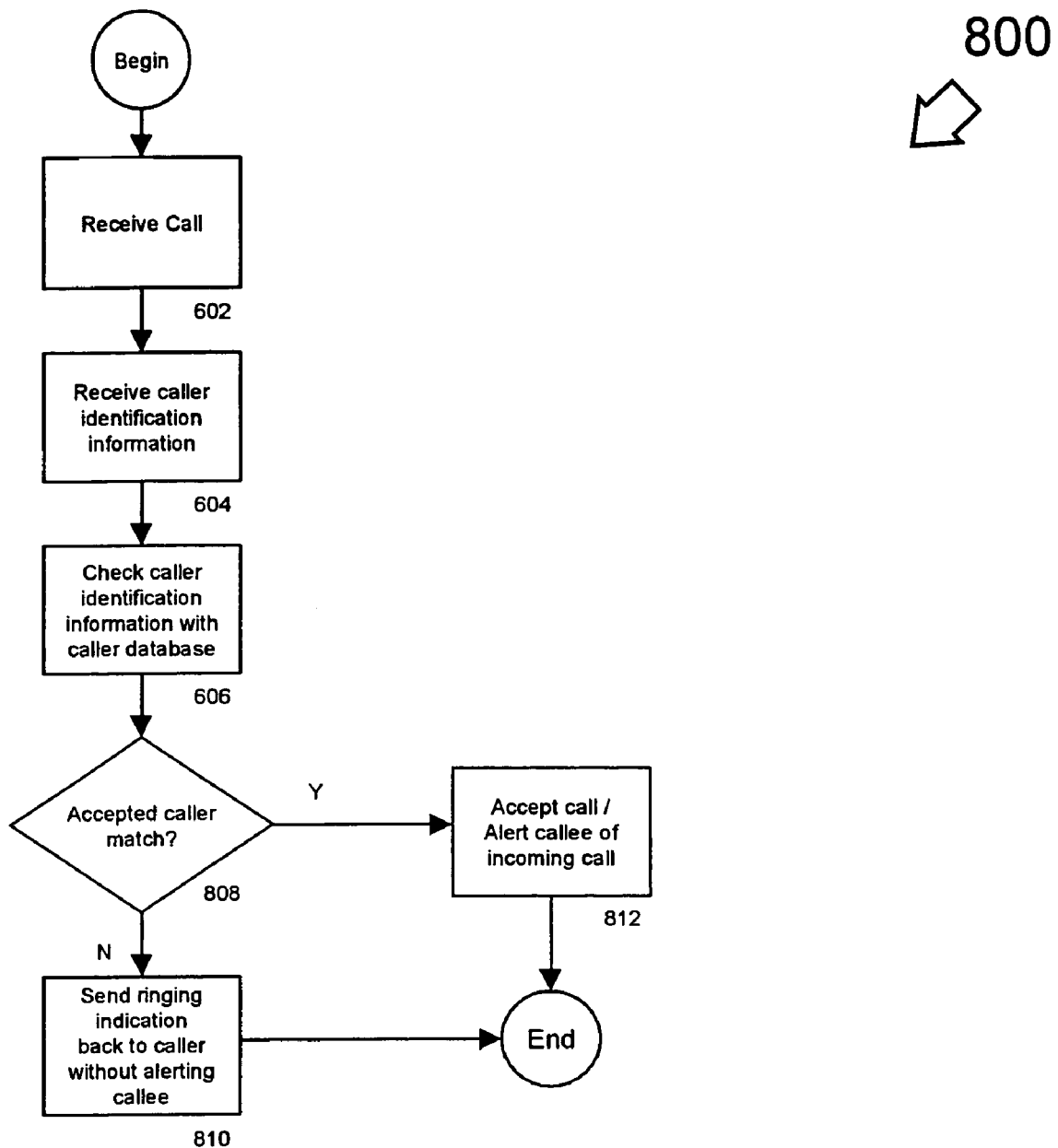

FIG. 7 illustrates process 800. In this embodiment, the call manager 210 compares caller identification information with a list of acceptable callers in the caller database 244, at block 606. If the call manager 210 determines a match, at decision block 808, the call is accepted, at block 812. If not, the call manager 210 causes a false ringing indication to be sent to the caller, at block 810. Hence, in this embodiment, only calls that do not match a list of acceptable callers in the caller database are passively blocked.

Figure 8:
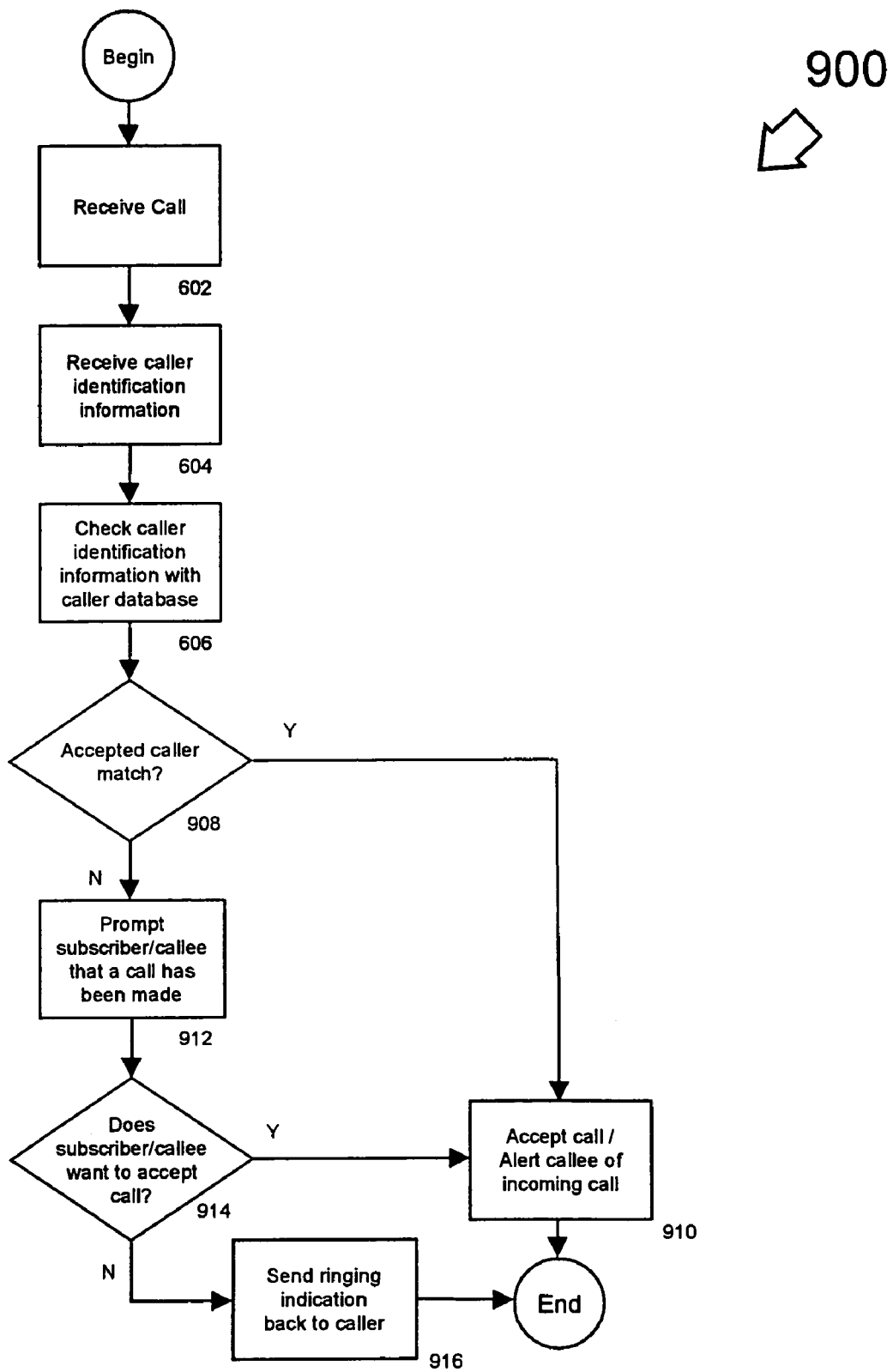

FIG. 8 illustrates process 900. This embodiment allows the call manager 210 to confirm that a caller should not be accepted. If the caller identification information does not match a acceptable caller in the caller database 244, at decision block 908, the call manager 210 will cause the callee to be prompted that a call has been made, at block 912, and confirm whether the callee wishes to accept the call, at decision block 914. If so, the call manager 210 will accept the call, at block 910. If not, a false ringing indication is sent to the caller, at block 916.

In an alternate embodiment, if the callee does not respond to the confirmation requests of processes 700 and 900 within a certain timeframe, a default action may be taken. For example, such a default action may be to send a false ringing indication or to accept the call.

Figure 9:
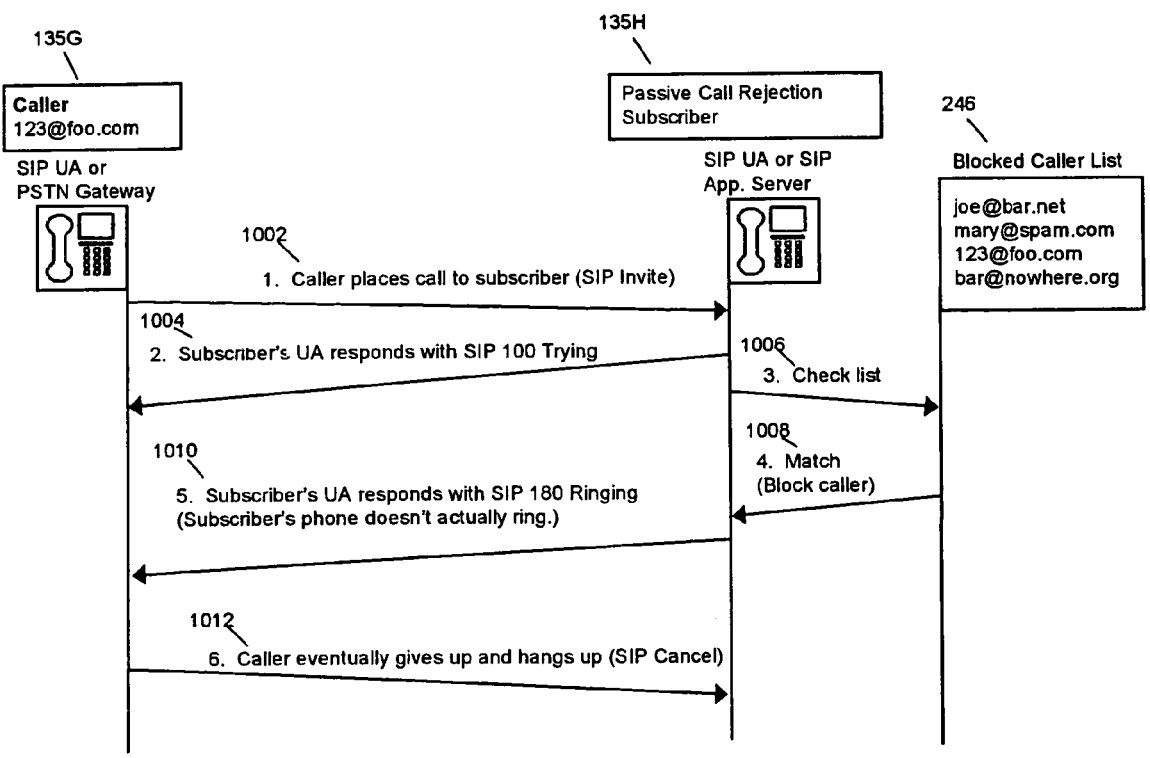
FIG. 9 depicts a method embodiment that facilitates passive call blocking in the SIP protocol.

Process 1000, in FIG. 9, is an embodiment of the invention in a system implementing the SIP protocol. The SIP protocol is commonly implemented in systems related to Internet telephony. In this embodiment, a caller 135G may place a call through a SIP User Agent (UA) or PSTN Gateway, at block 1002. In SIP terminology, this act may be described as a SIP Invite. The passive call block device 135H receiving the call may be a SIP UA or SIP Application Server. The passive call block device 135H responds with a SIP 100 Trying signal, at block 1004. The passive call block device 135H also compares the caller identification information sent by the caller to a Blocked Caller List 246, at block 1006. If the caller identification information is matched in the blocked caller list, at decision block 1008, the passive call block device sends a passive call block response, at block 1010. In this embodiment, the response may be a SIP 180 Ringing signal. If the passive call block response is sent, the passive call block device does not alert the callee of the incoming call. Upon receiving the SIP 180 Ringing signal, the caller will eventually hang up, sending a SIP Cancel signal, at block 1012.

In alternate embodiments, these processes are easily applied to passively block outgoing calls. In such embodiments, the call is received by the passive call block device 135 prior to being transmitted to the callee. The call is accepted for transmission only if the call is not blocked. Otherwise, the caller is sent a false ringing indication. The subscriber to the passive call block system may also verify the block or acceptance of outgoing calls.

In alternate embodiments, these processes are also easily implemented at the destination switch of a telecommunications network. It is well known in the art that network 110, of FIG. 1, may comprise switches that facilitate the routing of calls from source to destination. For example, in a PSTN environment utilizing the Common Channel Signaling System No. 7 protocol (SS7), passive call block processing may occur at a Service Switching Point (SSP).

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A method comprising:
 receiving a call from a caller, the call including caller identification information;
 sending a false ringing indication to the caller when a subscriber blocks the call after being prompted.

2. The method of claim 1, further comprising:
 accepting the call when the caller identification information does not match the entry in the caller database.

3. The method of claim 1, further comprising:
 prompting a subscriber to block the call when the caller identification information does not match the entry in the caller database.

4. The method of claim 3, further comprising:
 accepting the call when the subscriber does not block the call after being prompted.

5. The method of claim 4, further comprising:
 performing a predetermined default action when the subscriber does not respond after being prompted.

6. The method of claim 1, wherein the call is a Session Initiation Protocol (SIP) Invite.

7. The method of claim 1, wherein the false ringing indication is a Session Initiation Protocol 180 Ringing.

8. The method of claim 6, further comprising:
 responding to the SIP Invite with a SIP 100 Trying.

9. The method of claim 6, further comprising:
 receiving a SIP Cancel.

10. A method comprising:
 receiving a call from a caller, the call including caller identification information;
 accepting the call when the caller identification information matches an entry in a caller database;
 sending a false ringing indication to the caller when a subscriber does not accept the call after being prompted.

11. The method of claim 10, further comprising:
 sending a false ringing indication to the caller when the caller identification information does not match the entry in the caller database.

12. The method of claim 10, further comprising:
 prompting a subscriber to accept the call when the caller identification information does not match the entry in the caller database.

13. The method of claim 12, further comprising:
 accepting the call when the subscriber accepts the call after being prompted.

14. The method of claim 10, wherein the call is a Session Initiation Protocol (SIP) Invite.

15. The method of claim 11, wherein the false ringing indication is a Session Initiation Protocol 180 Ringing.

16. The method of claim 14, further comprising:
 responding to the SIP Invite with a SIP 100 Trying.

17. The method of claim 14, further comprising:
 receiving a SIP Cancel.

18. A computer-readable medium encoded with data and instructions, the data and instructions causing an apparatus executing the instructions to:
 match caller identification information with an entry in a caller database;
 send a false ringing indication to the caller when a subscriber blocks the call after being prompted.

19. The computer-readable medium of claim 18, the instructions further comprising:
 accepting the call when the caller identification information does not match the entry in the caller database.

20. The computer-readable medium of claim 18, the instructions further comprising:
 prompting a subscriber to block the call when the caller identification information does not match the entry in the caller database.

21. The computer-readable medium of claim 20, the instructions further comprising:
 accepting the call when the subscriber does not block the call after being prompted.

22. The computer-readable medium of claim 18, wherein the call is a Session Initiation Protocol (SIP) Invite.

23. The computer-readable medium of claim 18, wherein the false ringing indication is a Session Initiation Protocol 180 Ringing.

24. The computer-readable medium of claim 22, the instructions further comprising:
responding to the SIP Invite with a SIP 100 Trying.

25. The computer-readable medium of claim 22, the instructions further comprising;
receiving a SIP Cancel.

26. A computer-readable medium encoded with data and instructions, the data and instructions causing an apparatus executing the instructions to:
receive a call, the call associated with caller identification information;
display the caller identification information;
prompt a user to accept the call;
send a false ringing indication to a caller when the subscriber does not accept the call alter being prompted.

27. The computer-readable medium of claim 26, the instructions further comprising:
sending a false ringing indication to the caller when the caller identification information does not match the entry in a caller database.

28. The computer-readable medium of claim 26, the instructions further comprising:
accepting the call when the subscriber accepts the call after being prompted.

29. The computer-readable medium of claim 26, wherein the call is a Session Initiation Protocol (SIP) Invite.

30. The computer-readable medium of claim 27, wherein the false ringing indication is a Session Initiation Protocol 180 Ringing.

31. The computer-readable medium of claim 29, the instructions further comprising:
responding to the SIP Invite with a SIP 100 Trying.

32. The computer-readable medium of claim 29, the instructions further comprising:
receiving a SIP Cancel.

33. An apparatus comprising:
means for receiving a call from a caller, the call including caller identification information;
means for accepting the call when the caller identification information matches an entry in a caller database; and,
means for sending a false ringing indication to the caller when the caller identification information does not match the entry in the caller database.

34. The apparatus of claim 33, further comprising;
means for prompting a subscriber to accept the call when the caller identification information does not match the entry in the caller database.

35. The apparatus of claim 34, further comprising:
means for sending a false ringing indication to the caller when the subscriber does not accept the call after being prompted.

36. The apparatus of claim 34, further comprising:
means for accepting the call when the subscriber accepts the call after being prompted.

37. The apparatus of claim 33, wherein the call is a Session Initiation Protocol (SIP) Invite.

38. The apparatus of claim 33, wherein the false ringing indication is a Session Initiation Protocol 180 Ringing.

39. The apparatus of claim 37, further comprising:
means for responding to the SIP Invite with a SIP 100 Trying.

40. The apparatus of claim 37, further comprising:
means for receiving a SIP Cancel.

41. An apparatus comprising:
a communication interface configured to receive a call from a caller, the call including caller identification information;
a processor configured to send a false ringing indication to the caller when the subscriber does not accept the call after being prompted.

42. The apparatus of claim 41, wherein the processor is further configured to accept the call when the subscriber accepts the call after being prompted.

43. The apparatus of claim 41, wherein the call is a Session Initiation Protocol (SIP) Invite.

44. The apparatus of claim 41, wherein the false ringing indication is a Session Initiation Protocol 180 Ringing.

45. The apparatus of claim 43, wherein the processor is further contigured to respond to the SIP Invite with a SIP 100 Trying.

46. The apparatus of claim 43, wherein the processor is further configured to receive a SIP Cancel.

47. An apparatus comprising:
means for receiving a call from a caller, the call including caller identification information;
means for sending a false ringing indication to the caller when the subscriber does not accept the call after being prompted.

48. The apparatus of claim 47, further comprising:
means for sending a false ringing indication to the caller when the caller identification information does not match the entry in the caller database.

49. The apparatus of claim 47, further comprising:
means for prompting a subscriber to accept the call when the caller identification information does not match the entry in the caller database.

50. The apparatus of claim 49, further comprising:
means for accepting the call when the subscriber accepts the call after being prompted.

51. The apparatus of claim 47, wherein the call is a Session Initiation Protocol (SIP) Invite.

52. The apparatus of claim 48, wherein the false ringing indication is a Session Initiation Protocol 180 Ringing.

53. The apparatus of claim 51, further comprising:
means for responding to the SIP Invite with a SIP 100 Trying.

54. The apparatus of claim 51, further comprising:
means for receiving a SIP Cancel.

* * * * *